(12) United States Patent
Dykstra

(10) Patent No.: US 12,012,317 B2
(45) Date of Patent: Jun. 18, 2024

(54) RANGE HOOD SUPPORT LIFT

(71) Applicant: Solution Tool, LLC, Zeeland, MI (US)

(72) Inventor: Brian R. Dykstra, Zeeland, MI (US)

(73) Assignee: Solution Tool, LLC, Zeeland, MI (US)

( * ) Notice: Subject to any disclaimer, the term of this patent is extended or adjusted under 35 U.S.C. 154(b) by 65 days.

(21) Appl. No.: 17/374,526

(22) Filed: Jul. 13, 2021

(65) Prior Publication Data

US 2022/0009757 A1 Jan. 13, 2022

Related U.S. Application Data

(60) Provisional application No. 63/050,903, filed on Jul. 13, 2020.

(51) Int. Cl.
*B66F 1/02* (2006.01)
*B62B 3/02* (2006.01)
*B62B 5/00* (2006.01)
*F24C 15/20* (2006.01)

(52) U.S. Cl.
CPC ................. *B66F 1/02* (2013.01); *B62B 3/02* (2013.01); *B62B 5/0083* (2013.01); *B62B 2203/10* (2013.01); *B62B 2205/06* (2013.01); *B62B 2206/02* (2013.01); *F24C 15/2071* (2013.01)

(58) Field of Classification Search
CPC ........ E04B 1/34357; E04B 1/19; E04B 1/344; A47B 51/00; F24C 15/2071; B60P 3/40; B62B 5/0086; B62B 2203/10; B62B 2206/02; B62B 3/02; B62B 5/0083; B63C 3/06; B63C 3/12; B66F 1/02; B66F 1/06
See application file for complete search history.

(56) References Cited

U.S. PATENT DOCUMENTS

| | | | |
|---|---|---|---|
| 1,322,719 A | 10/1919 | Nelson | |
| 2,174,870 A | 10/1939 | Daniels | |
| 2,337,796 A * | 12/1943 | Baker | E04F 21/1822 248/412 |
| 2,738,983 A | 3/1956 | Essig | |
| 3,168,329 A | 2/1965 | Goldschmidt | |
| 3,807,750 A | 4/1974 | Brown | |
| 3,850,409 A * | 11/1974 | Davis | B66F 13/00 254/133 R |

(Continued)

FOREIGN PATENT DOCUMENTS

| | | | |
|---|---|---|---|
| DE | 19535874 A1 | * | 4/1997 |
| DE | 202014100645 | * | 3/2014 |
| DE | 202014100645 U1 | * | 3/2014 |

OTHER PUBLICATIONS

Hood Lift from Solution Tool, found at: https://www.youtube.com/watch?v=5Oj4hX8YJyM (Year: 2020).*

(Continued)

*Primary Examiner* — Mahdi H Nejad
(74) *Attorney, Agent, or Firm* — Frank M. Scutch, III

(57) ABSTRACT

A range hood support lift for positioning and supporting the weight of range hoods, exhaust vents, microwave ovens, and the like during the installation process. The range hood support lift includes a support section having a plurality of support arms. A base section includes a plurality of legs and a scissor section separates the plurality of legs. In use, the base section adjusts the height of the support section above the base section and the scissor section adjusts the distance between the plurality of legs.

11 Claims, 4 Drawing Sheets

(56) References Cited

U.S. PATENT DOCUMENTS

| | | | | |
|---|---|---|---|---|
| 4,011,803 | A | | 3/1977 | Pfaffinger |
| 4,128,234 | A | * | 12/1978 | McKee .................. B25B 11/02 |
| | | | | 269/97 |
| 4,638,563 | A | * | 1/1987 | Buniff ...................... G01B 3/08 |
| | | | | 33/833 |
| 4,649,581 | A | * | 3/1987 | Lee, Jr. ................ A61G 7/1057 |
| | | | | 414/458 |
| 5,439,152 | A | * | 8/1995 | Campbell ................ B60R 9/00 |
| | | | | 211/195 |
| 5,599,031 | A | * | 2/1997 | Hodges ................ B62B 5/0083 |
| | | | | 280/35 |
| 5,660,637 | A | * | 8/1997 | Dodge ................ B05B 13/0285 |
| | | | | 211/208 |
| 5,873,175 | A | * | 2/1999 | Johnston .................. G01B 3/08 |
| | | | | 33/783 |
| 5,951,406 | A | * | 9/1999 | Steane ................ A63G 11/00 |
| | | | | 472/111 |
| 6,337,651 | B1 | * | 1/2002 | Chiang ................ H03M 1/442 |
| | | | | 341/161 |
| 6,488,160 | B2 | * | 12/2002 | Wang ........................ A47F 7/19 |
| | | | | 211/195 |
| 7,055,802 | B1 | * | 6/2006 | Jones ........................ B62B 1/12 |
| | | | | 254/122 |
| 7,104,429 | B1 | * | 9/2006 | Flores ...................... B60P 3/40 |
| | | | | 224/403 |
| 8,353,490 | B2 | * | 1/2013 | Spinelli .................. F16M 11/22 |
| | | | | 211/175 |
| 2003/0091417 | A1 | * | 5/2003 | Swann .................. B62B 5/0083 |
| | | | | 414/458 |
| 2008/0054580 | A1 | * | 3/2008 | Glaser .................. B62B 5/0086 |
| | | | | 280/35 |
| 2014/0017009 | A1 | * | 1/2014 | Hey .......................... B63C 3/06 |
| | | | | 405/3 |
| 2019/0231618 | A1 | * | 8/2019 | Ueda .................... A61G 5/0866 |
| 2021/0404786 | A1 | * | 12/2021 | Williams ................ G01B 3/08 |
| 2022/0048603 | A1 | * | 2/2022 | Buksowicz ............... B63C 3/06 |

OTHER PUBLICATIONS

HL_Brochure_0222_r02 (Year: 2020).*
Hood-Lift-Manual (Year: 2021).*
Fortable and Foldable Leaving Stand; Document ID: KR 102000998 B1; Date Published: Jul. 17, 2019; Inventor: Chae Myung Gil; Date Filed: Jun. 3, 2019 (Year: 2019).*

* cited by examiner

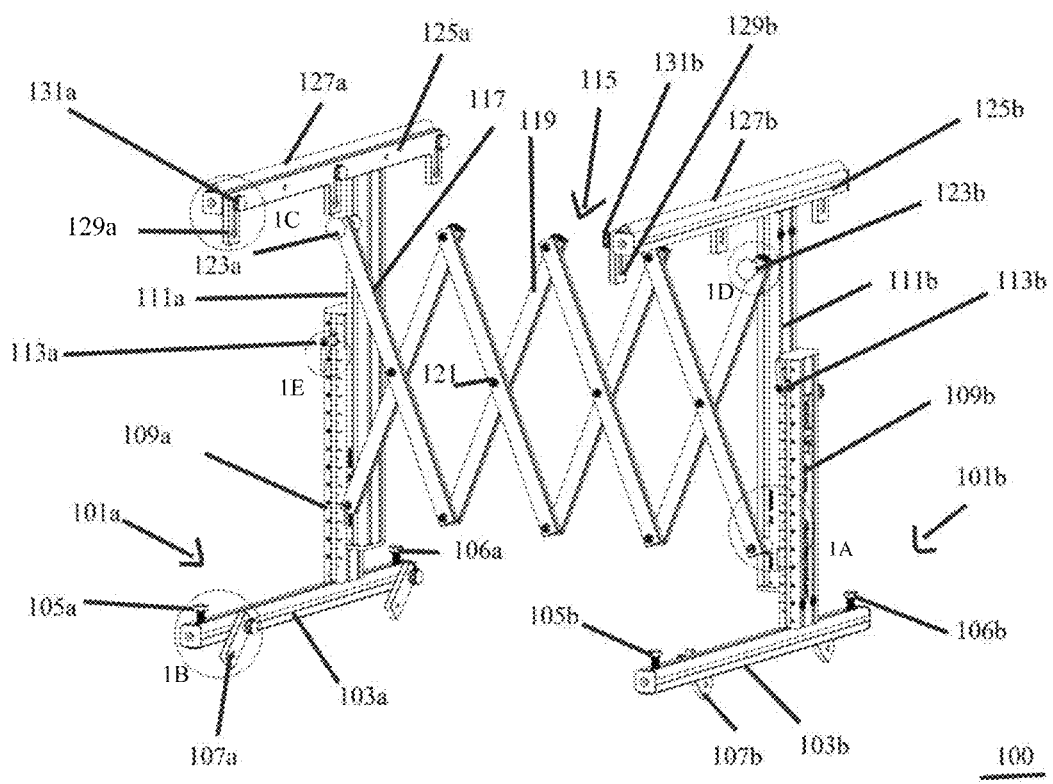
FIG. 1
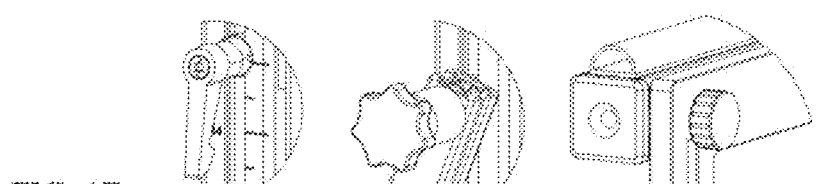
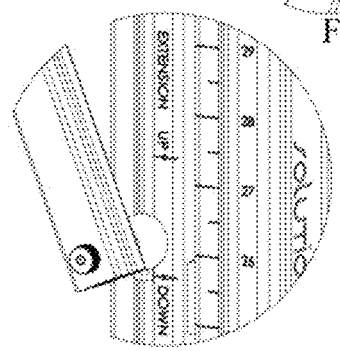
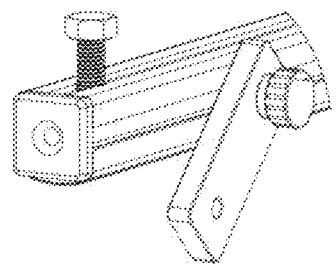
FIG. 1E  FIG. 1D  FIG. 1C
FIG. 1A  FIG. 1B

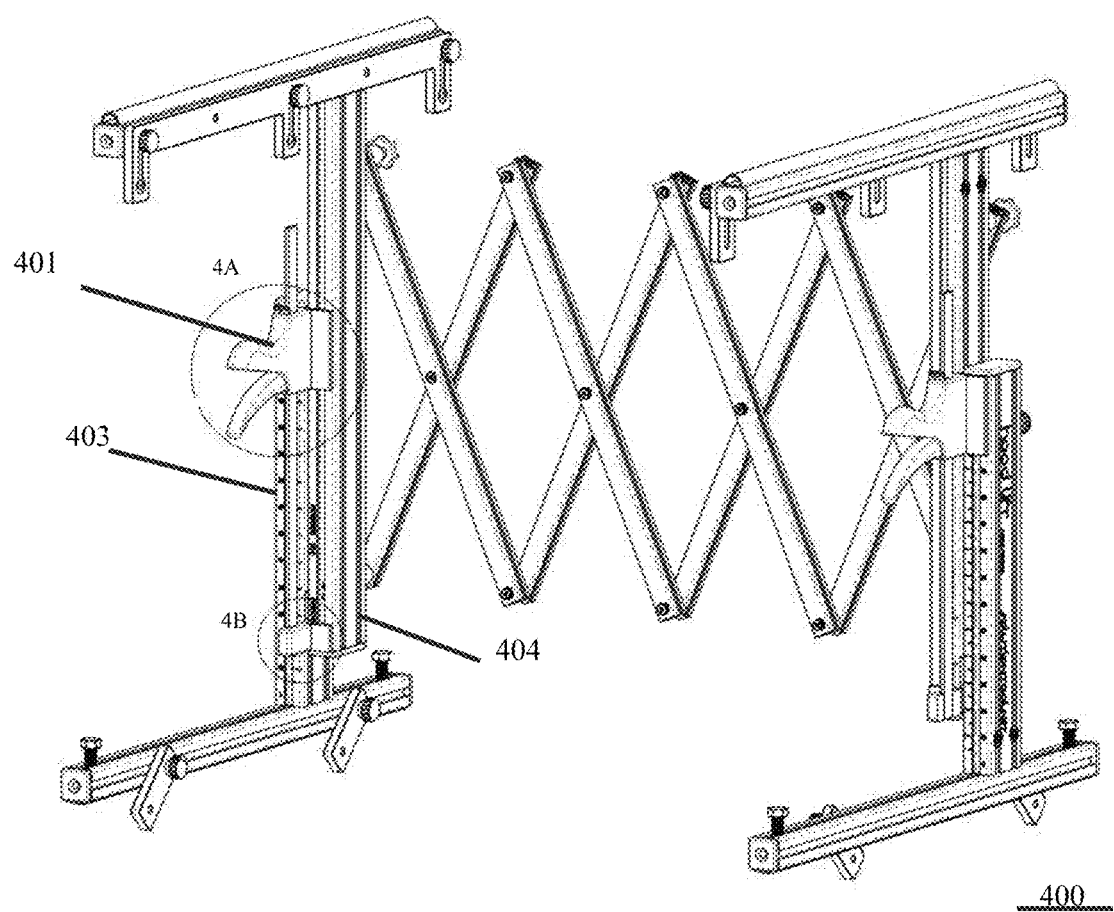
FIG. 4
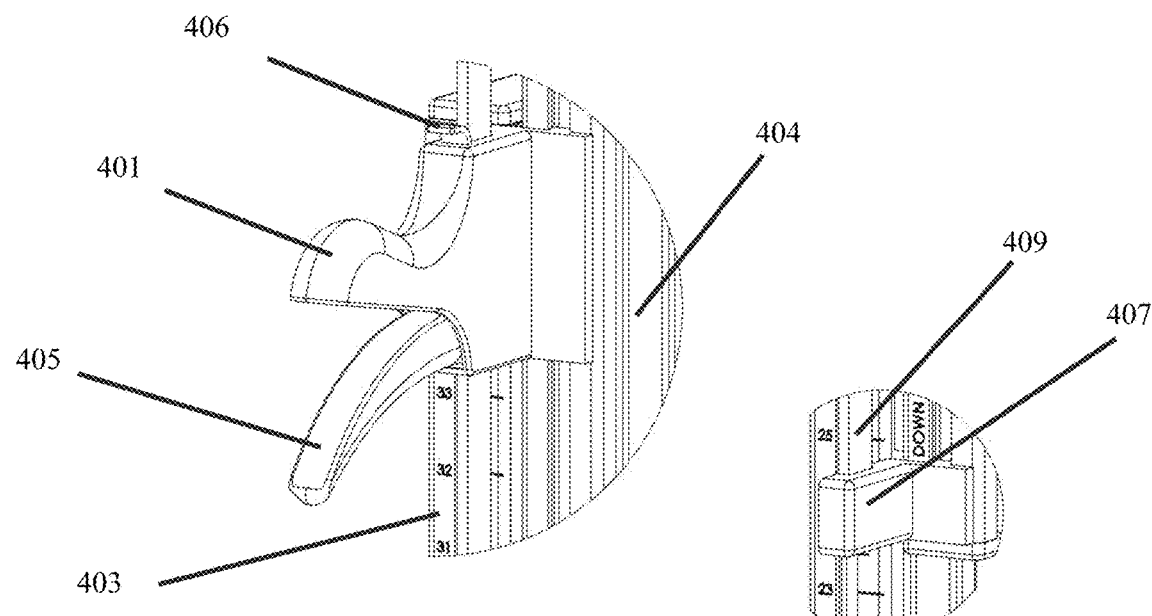
FIG. 4A
FIG. 4B

RANGE HOOD SUPPORT LIFT

FIELD OF THE INVENTION

The present invention relates generally to construction tools and more particular to a lift for assisting in the installation of a kitchen range hood.

BACKGROUND

A range hood is a device used directly above a kitchen stove that often consists of a cover with a fan. The cover is typically decorative sheet metal duct type work that acts to remove steam, smoke, and/or unpleasant smells that are emitted by cooked food on the stove top or oven. The range hood is typically installed at some predetermined height and location above the stove to be functional while also giving the stove and kitchen a pleasant overall appearance.

One problem in installing the range hood is that the hood is often both bulky and heavy. In use, the hood is typically installed above a kitchen range, between cabinets or on a kitchen island. Installation often requires two or more men to lift and hold the hood into position while fastening the hood to some fixed object e.g., a wall. This can be both fatiguing and dangerous since it can lead to improper installation of the hood and appliance. Care must be taken to permanently fasten the hood above the stove which most often requires the presence of several installation technicians. Accordingly, new solutions are needed to assist the appliance installer when installing the hood above a range or stove top.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 1 is a front perspective view of the range hood support lift according to an embodiment of the invention.

FIG. 1A, FIG. 1B, FIG. 1C, FIG. 1D and FIG. 1E are magnified views of fastener mechanisms as shown in the detailed magnifications shown in FIG. 1.

FIG. 4 is a perspective view of an alternative embodiment of the range hood support lift illustrating a frictional raising mechanism.

FIG. 4A and FIG. 4B are magnified views of the raising trigger and engagement clip illustrated in FIG. 4.

Figure 2:
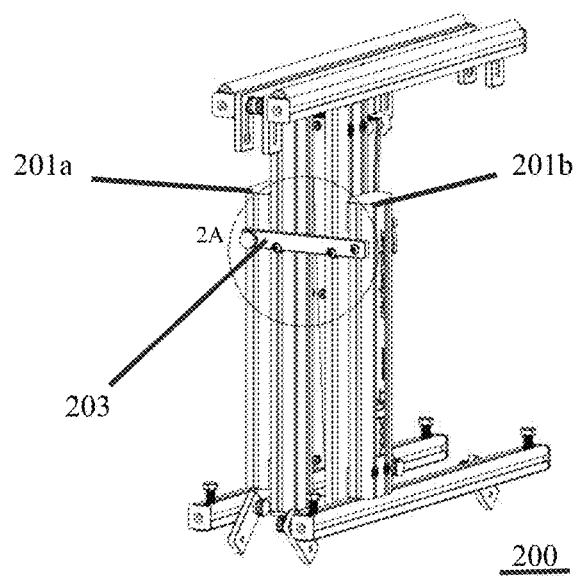
FIG. 2 is a rear view illustrating the range hood support lift in a collapsed position for use with the locking bar.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a range hood support lift. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The present invention relates in general to a range hood support lift for a serviceman or installer to handle built-in appliances such as range hoods, exhaust vents, microwave ovens, and the like. FIG. 1 is a front perspective view of the range hood support lift according to an embodiment of the invention. With regard to FIG. 1 and the magnified views shown in FIGS. 1A, 1B, 1C, 1D and 1E, the range hood support lift 100 includes a left-hand foot assembly 101a and right-hand foot assembly 101b each include a support leg 103a, 103b that both extend substantially horizontally across a supporting surface to provide structural stability. Each of the support legs 103a, 103b, including leveling feet 105a, 106a, 105b and 106b for leveling each of the support legs across a surface. Each of the support leg 103a, 103b further includes one or more centering locators 107a, 107b for centering and/or fixing the location of each of the support legs 103a, 103b to the side of a countertop or other surfaces to provide greater lateral stability. As best seen in magnified view FIG. 1B, the centering locator 107a is frictionally held into a fixed position using a locking knob.

Leg frames 109a, 109b are vertically connected to each respective support leg 103a, 103b. When used in combination with each respective arm frame 111a, 111b, each leg frame 109a, 109b includes a slotted channel allowing the arm frame to ride within the channel enabling the arm frame 111a, 111b to be set to a desired height above a supporting surface. As seen in the magnified view of FIG. 1A, each leg frame includes a vertical rule, measure and/or scale indicator allowing the service technician/installer to set each arm frame 111a, 111b to a desired height and locking the arm frame 111a, 111b into a fixed position using a respective height locking leaver 113a, 113b. The magnified view shown in FIG. 1E illustrates a locking lever 113a holding both the leg frame 109a and arm frame 111a together into a fixed position.

In order to provide a fixed separation between the left-hand foot assembly 101a and right-hand foot assembly 101b, an accordion-style adjustable scissor mechanism 115 is used. The scissor mechanism 115 includes a plurality of first cross-members 117 and a plurality of second cross-members 119 that overlap at a plurality of pivot points 121. As seen in the magnified view of FIG. 1A, a cross-member 117 pivotably connects with arm frame 111b. This crossover type arrangement allows the overall length of the scissor mechanism 115 to be shortened or length as needed to separate the left-hand foot assembly 101a and right-hand foot assembly 101b at some desired distance. The distance would typically be the approximate length of a range hood or shorter. The scissor mechanism 115 can be locked into position using respective width locking knobs 123a, 123b.

Further, each arm frame 111a, 111b supports a respective arm support via left arm support 125a and right arm support 125b. The left arm support 125a and right arm support 125b each include a padded surface such as top section 127a, 127b which prevents scratching or other damage to the range hood or appliance during installation. Should more overall height be needed to get the range hood in proper position during installation, the left arm support 125a and right arm support 125b each include respective arm extensions 129a, 129b, that work to raise the arm several additional inches in height. As seen in magnified view FIG. 1C, once positioned, each of the arm extensions 129a, 129b can be locked in position using respective screw fasteners 131a, 131b.

Figure 2A:
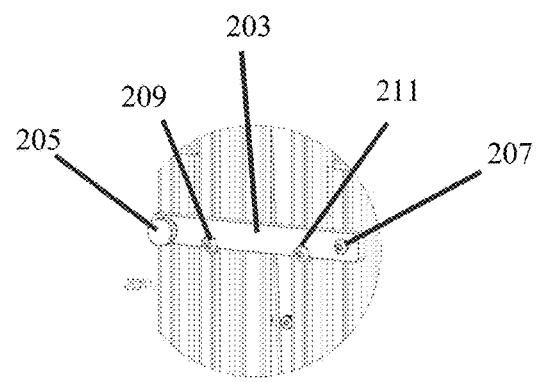
FIG. 2A is a magnified view of the locking bar shown in FIG. 2.

FIG. 2 is a rear view illustrating the range hood support lift in a collapsed position using a locking bar. FIG. 2A is a magnified view of the locking bar shown in FIG. 2. In this illustration, the range hood support lift 200 and its scissor mechanism is shown compressed and/or collapsed for storage where the left leg frame 201a and right leg frame 201b are held together using a locking bar 203. Notches 209, 211 engage with screw shafts to hold the locking bar 203 in a fixed position. A locking knob 205 works to hold the locking bar tightly in place for storage or transport of the support lift.

Figure 3A:
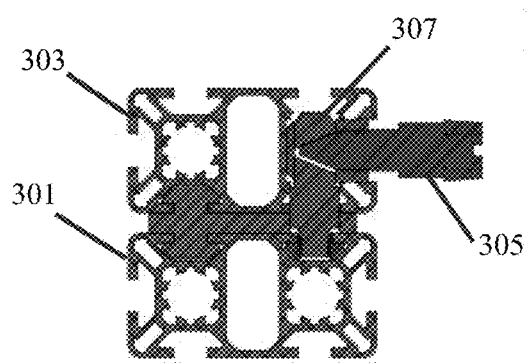
FIG. 3A is a magnified cross-sectional view shown though lines III-III of FIG. 3.
Figure 3:
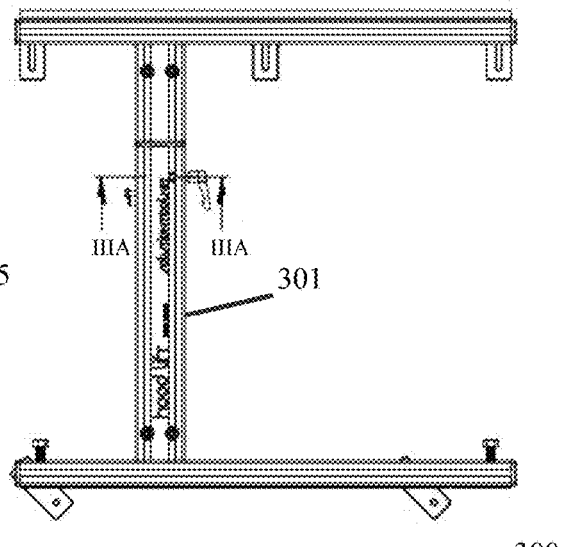
FIG. 3 is a side view of the range hood lift.

FIG. 3 is a side view of the range hood lift. FIG. 3A is a magnified cross-sectional view shown though lines IIIA-IIIA of FIG. 3. The range hood lift 300 is illustrated where the right leg frame 301 is joined with and/or coupled to the right arm frame 303. This may be accomplished using a quarter turn fastener system or the like. The fastener system includes a male fastener 305 that engages orthogonally with a female receiver 307. The female receiver 307 spans internally though both the right leg frame 301 and right arm frame 303. The male fastener 305 is inserted within the female receiver 307 and turned to facilitate locking engagement. This works to hold the respective leg frame and arm frame surfaces firmly in place.

FIG. 4 is a perspective view of an alternative embodiment of the range hood support lift illustrating a clamp or frictional raising mechanism. FIG. 4A and FIG. 4B are magnified views of the raising trigger and engagement clip illustrated in FIG. 4. The range hood support lift 400 uses a bar clamp 401 that is fixed to leg frame 403 and is slidably engaged to arm frame 404 and through a frictional mechanism to bar rail 409. A bar mount 407 is fixed to arm frame 404 that secures the bar rail 409 to arm frame 404. In use, with each actuation of trigger 405, the bar rail 409 is drawn upward roughly a ¼ inch carrying with it bar mount 407 and arm frame 404. In this embodiment, rather than using bar locking levers to fix the height of the lift, the installer can individually use the trigger 405 that operates to raise and/or "jack up" the lift with each stroke of the trigger 405. A release button 406 is used solely in lowering the lift. This enables the installer or service technician to raise each respective arm support to a measured or desired level in one single motion.

Figure 5:
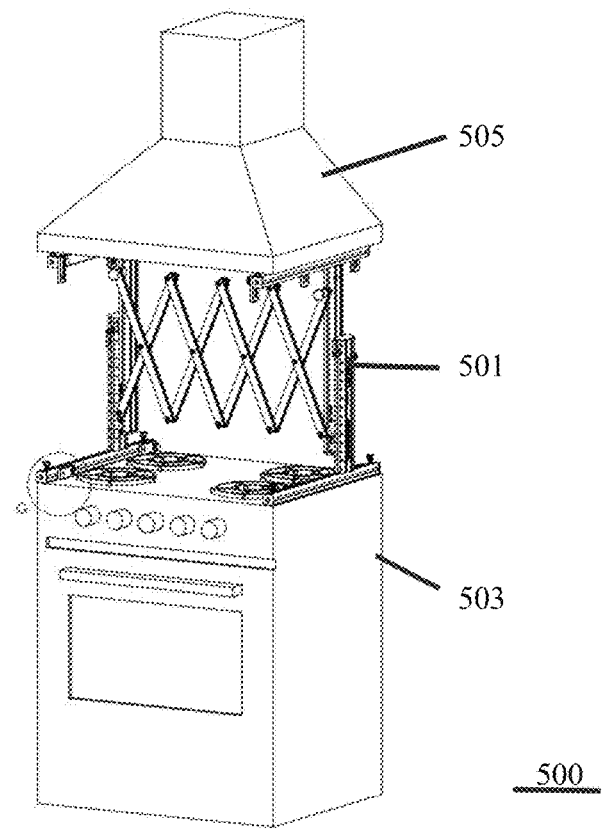
FIG. 5 is a perspective view illustrating the range hood support lift as used above a kitchen range.

FIG. 5 is a perspective view illustrating the range hood support lift as used above a kitchen range. In this type of installation environment 500, the support lift 501 is positioned on and above a kitchen range 503. The support lift 501 supports and bears the weight of the range hood 505 allowing for installation by only one installer.

Figure 6:
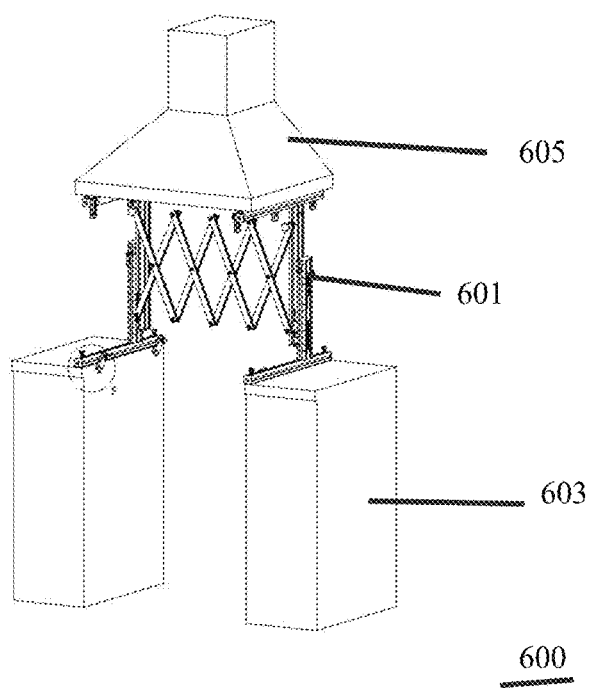
FIG. 6 is a perspective view illustrating the range hood support lift supported between kitchen cabinets.

FIG. 6 is a perspective view illustrating the range hood support lift supported between kitchen cabinets. In this type of installation environment 600, the support lift 601 is positioned on and above the surface of kitchen cabinets 603. The support lift 601 works to support and/or bear the weight of the range hood 605 allowing for installation by one installer.

During the installation, the range hood lift is typically placed on flat surface. If the installed hood height will be greater than 34¼ inches, or depth greater than 24 inches, the arm extensions are deployed. The locking bar is unlocked and height lock levers are loosened and/or released. The hood is adjusted for a correct installation height and thereafter the height locks are retightened. The width locks and respective width locking knobs are then loosened and the hood lift is expanded laterally until the legs straddle the range opening and are completely supported by the countertop adjacent to the range opening. The center locators are then deployed and the hood lift is re-adjusted so the legs and centering locators securely grasp the range opening edge. The width locks are tightened and the range hood is placed atop the lift. Minor height adjustments can then be made using the leveling feet and the hood installation is performed. This process is reversed when the installation technician wishes to return the hood lift to a storage position with hands and clothing kept away from moving parts. Thereafter all the lever, knobs and/or thumb screws are tightened to maintain the lift in its fixed storage position.

Hence, embodiments of the present invention are directed to a height and width adjustable, collapsible range hood support lift for assisting with the installation, removal and servicing of heavy appliances such as range hoods, exhaust vents, microwave ovens, and the like from above ranges, ovens, stoves, cook tops, grills, and built-in cabinetry. As seen in the figures herein, the range hood support lift includes a pair of assemblies that are composed of a lower leg structure that vertically interconnects through a clampable linear rail mechanism to an upper arm structure allowing for vertical height adjustment. The left-hand assembly is horizontally interconnected through a clampable scissors action mechanism designed to maintain parallelism to the right-hand assembly. Rather than installing a hood appliance using two or more servicemen i.e., one to support the appliance in place and the other to install fasteners, embodiments of the invention as described allow for easy installation of a range hood or the like using only one serviceman or installation technician. Various embodiments of the invention are particularly suitable for supporting heavy appliances without the awkward, costly, dangerous, and time-consuming burden associated with these types of installations.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A range hood support lift comprising:
a base section having two upside-down T-shape bases;
a support section having two T-shape supports, the support section slidably connected to the base section;
the support section and the base section form an I-shape;
a single scissor section connecting the two T-shape supports and vertically movable along with the two T-shape supports relative to the two upside-down T-shape bases to adjust a height of the range hood support lift;
wherein the single scissor section is configured to adjust a horizontal distance between the two T-shape supports and the two upside-down T-shape bases; and
wherein a range hood is supported on an upper surface of each of the two T-shape supports, and the two upside-down T-shape bases are supported on a supporting surface.

2. The range hood support lift as in claim 1, wherein the upper surface of each of the two T-shape supports is padded.

3. The range hood support lift as in claim 1, wherein each of the two T-shape supports include a measuring rule for adjusting a height of each of the two T-shape supports.

4. The range hood support lift as in claim 1, wherein each of the two upside-down T-shape bases has a plurality of leveling feet on a lower surface thereof.

5. The range hood support lift as in claim 1, wherein the single scissor section including a plurality of interconnected cross-members that are adjusted in an accordion like movement.

6. The range hood support lift as in claim 1, wherein each of the two T-shape supports comprises a plurality of extensions for increasing an overall height of each of the two T-shape supports above the supporting surface.

7. The range hood support lift as in claim 1, wherein each of the two vertically movable T-shape supports are locked into a fixed position relative to a respective one of the two upside-down T-shape bases using a height locking lever.

8. The range hood support lift as in claim 1, a frictional raising mechanism moves each of the two vertically movable T-shape supports relative to a respective one of the two upside-down T-shape bases using a bar clamp.

9. The range hood support lift as in claim 8, wherein each of the two vertically movable T-shape supports are locked into a fixed position relative to a respective one of the two upside-down T-shape bases using the bar clamp.

10. The range hood support lift as in claim 1, further comprising a locking bar configured to lock horizontal distance between the two T-shape supports and the two upside-down T-shape bases in a closed position.

11. An appliance support lift comprising:
a base section having two upside-down T-shape bases;
a support section having two T-shape supports, the support section slidably connected to the base section;
the support section and the base section form an I-shape;
a single scissor section connecting the two T-shape supports and vertically movable along with the two T-shape supports relative to the two upside-down T-shape bases to adjust a height of the appliance support lift;
wherein the single scissor section is configured to adjust a horizontal distance between the two T-shape supports and the two upside-down T-shape bases;
wherein an appliance is supported on an upper surface of each of the two T-shape supports, and
the two upside-down T-shape bases are supported on a supporting surface.

* * * * *